Dec. 17, 1940.  E. GEISS  2,225,338

IMMERSION PUMP ARRANGEMENT

Filed April 26, 1938

Inventor:
Eugen Geiss,
by Harry E. Dunham
His Attorney.

Patented Dec. 17, 1940

2,225,338

UNITED STATES PATENT OFFICE 2,225,338

IMMERSION PUMP ARRANGEMENT

Eugen Geiss, Berlin, Germany, assignor to General Electric Company, a corporation of New York Application April 26, 1938, Serial No. 204,421
In Germany May 13, 1937

5 Claims. (Cl. 103—87)

The present invention relates to immersion pump arrangements comprising a liquid pump normally located under the liquid level and an electric motor for driving the pump. In ordinary arrangements of this kind the pump shaft is usually coupled to the motor shaft and the motor is located above the liquid level. This necessitates considerable shaft length and great over-all length of the aggregate. Another drawback of this type of arrangement is the high friction loss in the bearings and in the liquid.

The object of my invention is to provide an improved construction and arrangement of motor-driven liquid pumps whereby the over-all length and the number of necessary bearings are considerably reduced. This is accomplished by the provision of an arrangement in which the rotor of the electric motor surrounds its stator and by attaching the rotatable pump element which may be in the form of a screw or an impeller to the outer portion of the motor rotor. An arrangement of this kind is short in length and by uniting the motor rotor with the pump rotor the number of bearings may be reduced to two, thereby reducing considerably the friction loss of the bearings. Furthermore, in such arrangement the surface of the movable parts which cause losses due to friction with the liquid being pumped are reduced by the elimination of the rotor and pump shaft and the coupling between them. Electric motors may be operated under water by suitably insulating the stator winding. Such arrangement affords at the same time a good dissipation of the heat losses of the motor. In a preferred arrangement according to my invention the rotor space communicates with the discharge side of the pump so that the water entering into the rotor space is discharged therefrom through the rotor bearings into the pump space. The continuous flow of water or like liquid through the interior of the motor effects a good dissipation of the heat losses of the motor and at the same time a good lubrication and cooling of the bearing surface between the rotor and the stationary casing. In addition, the higher pressure in the interior of the motor prevents the entrance of foreign bodies from the pump space through the bearing surfaces.

Figure 1:
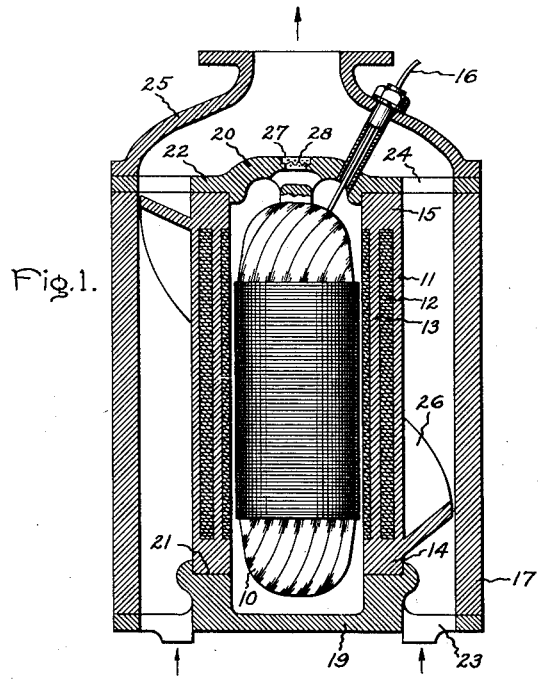
Figure 3:
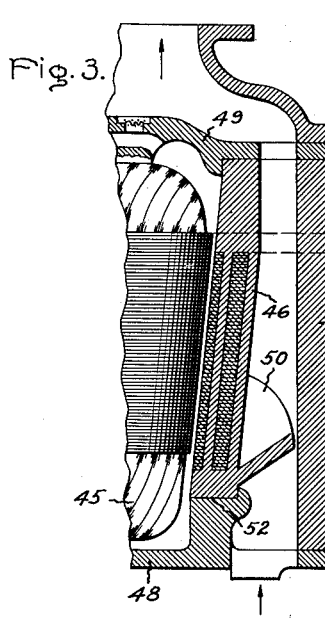
Figure 2:
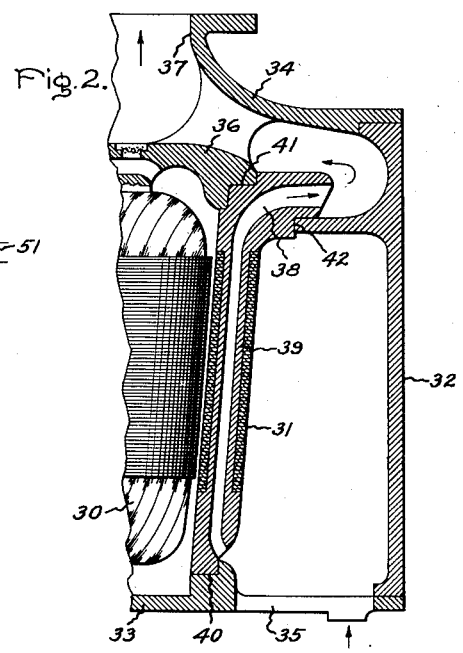

For a better understanding of what I believe to be novel and my invention, attention is directed to the following description and the claims appended thereto in connection with the accompanying drawing, in which Figs. 1, 2 and 3 show different embodiments of my invention.

The arrangement of Fig. 1 comprises an electric motor which has a stator 10 surrounded by a rotor 11. The rotor 11 has a magnetic path formed by laminations 12 and a squirrel cage comprising conductors 13 conductively connected to end rings 14 and 15. The stator is connected to a source of electric energy by a conductor 16. The motor is centrally located within a pump casing 17 which has a lower end plate 19 and an upper end plate 20 forming bearings 21 and 22 respectively for the rotor of the drive motor. The lower end plate has openings 23 forming an inlet to the pump and the upper end plate 20 has openings 24 forming a pump discharge to a flanged conduit 25. The upper end plate 20 also forms a support for the stator 10 which in the present instance is integrally attached to a central portion of the upper end plate. The pump in the present instance is of the screw type comprising a helical screw-shaped blade 26 secured to, in the present instance integrally united with, the outer surface of the rotor 11.

During operation of the motor, rotation of the rotor with the screw-shaped impeller 26 causes liquid to be forced into the inlet 23 and discharged through the outlet openings 24 and the conduit 25. In order to provide for effective cooling of the interior of the motor, the interior of the motor communicates with the pump discharge through an opening 27 in the upper end plate which is preferably provided with a screen 28 to prevent entrance of solid matter into the interior of the motor. During operation liquid discharged by the pump is forced into the interior of the motor through the screen 28 and thereby establishes a pressure in the interior of the motor which is above the pump inlet pressure. This prevents foreign matter from entering through the lower bearing 21 into the motor and in addition causes a continuous flow of liquid from the interior of the motor through the lower bearing 21, thus effectively lubricating and cooling the latter. By thus uniting the motor with the pump, both attain a comparatively short length without appreciably increasing the maximum diameter of the pump and motor unit.

While the pump in the arrangement of Fig. 1 is of the screw type, any other pump may be united with the motor. Fig. 2 shows an arrangement which includes a centrifugal type impeller pump. More specifically, the arrangement of Fig. 2 comprises a motor having a rotor 31 surrounding the stator 30. The motor is centrally located within a pump casing 32 which has lower and upper end plates 33 and 34 respectively forming end enclosures for the rotor. The lower end plate forms an inlet opening 35 of the pump and the upper end plate in the present instance forms a support 36 for the stator of the drive motor and a flanged discharge conduit 37. The centrifugal impeller type pump has an impeller 38 in the present instance integrally formed with the upper end of the rotor 31. An additional advantage is obtained by the provision of hollow conductors 39 in the rotor which communicate at their lower end with the inlet 35 and at their upper ends with the inlets of the passages of the impeller 38. The lower end of the rotor is supported on a thrust bearing 40 and the upper end of the rotor is supported on bearings 41 and 42 formed by the upper end plate 36 and by the outer casing 32. The rotor and the stator in the present arrangement are conically shaped. The conical shape causes a magnetic pull on the rotor directed upwardly, thus relieving the thrust on the thrust bearing 40 of the stator and the inclination of the hollow conductors 39 permits an increase of the impeller effect in case the outer diameter of the impeller is limited. The impeller passages form smooth continuations of the passage formed by the hollow conductors 39 or, from another viewpoint, the hollow conductors form part of the impeller passages for impelling fluid therein. In a preferred embodiment the conductors 39 are inclined to the axis of rotation in both the plane of the drawing as well as in a plane vertical thereto.

A further relief of pressure of the thrust bearing 40 by the conical arrangement of the rotor may be attained by axially displacing the rotor with regard to the stator. Such arrangement is shown in the modification of Fig. 3 which otherwise constitutes a combination of the arrangements of Figs. 1 and 2. The arrangement comprises a motor with a conically-shaped stator 45 surrounded by a correspondingly conically-shaped rotor 46. The latter is surrounded by a pump casing 47 and supported on bearings formed in lower and upper end plates 48 and 49 respectively of the pump casing 47. The pump is of the screw-type and has a helically-shaped blade 50 integrally formed on the outer surface of the rotor 46. The rotor is axially displaced by a distance 51 with regard to the stator. During operation, the magnetic flux produced by the stator has a tendency to pull the rotor upward due to the conical arrangement and due to the displacement 51. This relieves the pressure on the lower thrust bearing 52 caused by the weight of the rotor and the column of liquid acting thereon.

What I claim as new and desire to obtain by Letters Patent of the United States is:

1. In an immersion pump arrangement of the type in which the rotor of the drive motor surrounds the stator thereof and a rotatable pump element is secured to the outer surface of the rotor, the combination of a motor having lower and upper end plates forming bearings and end enclosures for the rotor, the lower end plate having radial extensions forming an inlet for the pump and the upper end plate having radial extensions forming an outlet for the pump, and an opening in the upper end plate communicating with the outlet to admit high pressure fluid to the interior of the motor, said fluid being discharged from the motor through said bearings thereby acting as a lubricant and a cooling medium for the motor.

2. In an immersion pump arrangement of the type in which the rotor of the drive motor surrounds the stator thereof and a rotatable pump element is secured to the outer surface of the rotor, the combination of a stator and a squirrel cage rotor with hollow conductors surrounding the stator and inclined toward the axis of rotation, a pump casing surrounding the motor, and an impeller wheel formed at the upper end of the rotor and having inlets communicating with the ends of the hollow conductors with the hollow conductors forming part of the impeller passages and acting to impel fluid therein.

3. In an immersion pump arrangement of the type in which the rotor of the drive motor surrounds the stator thereof and a rotatable pump element is secured to the outer surface of the rotor, the combination of a conically-shaped stator and a conically-shaped squirrel cage rotor with hollow conductors surrounding the stator, a pump casing surrounding the motor having end plates forming a support for the stator and having inlet and outlet openings, the outlet opening communicating with the discharge of the impeller and the inlet openings communicating with the free ends of the hollow conductors, said hollow conductors being inclined towards the axis of rotation and constituting part of the impeller passages to impel fluid therein, and means including the end plates for rotatably supporting the rotor.

4. In an immersion pump arrangement of the type in which the rotor of the drive motor surrounds the stator thereof and a rotatable pump element is secured to the outer surface of the rotor, the combination of a conically-shaped, vertically-arranged stator and a conically-shaped squirrel cage rotor surrounding the stator and being axially displaced with reference to the latter, a pump casing surrounding the motor, a rotatable pumping element in the casing being integrally formed with the rotor, end plates for the pump casing forming a rigid support for the stator and a thrust and guide bearing support for the rotor, one of the end plates having an opening to establish communication between the interior of the motor and the pump discharge side, the displacement between the rotor and the stator creating a magnetic pull in the rotor to relieve the thrust bearing from the pressure of pumped fluid.

5. In a vertical immersion pump arrangement of the type in which the rotor of the drive motor surrounds the stator thereof and a rotating pump element is secured to the outer surface of the motor, the combination of a motor comprising a conically-shaped stator, a conically-shaped squirrel cage rotor with hollow conductors surrounding the stator, lower and upper end plates forming thrust and guide bearings for the rotor, and a pump comprising extensions of the end plates to form inlets and outlets for the pump and an impeller formed at the upper end of the rotor and having inlets communicating with the ends of the hollow conductors whereby the hollow conductors constitute part of the impeller passages to impel fluid therein, the upper end plate having a central opening to admit fluid under pressure from the pump outlet to the interior of the motor for lubricating and cooling the motor.

EUGEN GEISS.